US008108137B2

(12) United States Patent
Kim

(10) Patent No.: US 8,108,137 B2
(45) Date of Patent: Jan. 31, 2012

(54) MAP SCROLLING METHOD AND NAVIGATION TERMINAL

(75) Inventor: Jong-Hyun Kim, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 786 days.

(21) Appl. No.: 12/168,365

(22) Filed: Jul. 7, 2008

(65) Prior Publication Data

US 2009/0024314 A1 Jan. 22, 2009

(30) Foreign Application Priority Data

Jul. 19, 2007 (KR) ........................ 10-2007-0072366

(51) Int. Cl.
*G01C 21/00* (2006.01)

(52) U.S. Cl. ........ 701/200; 701/208; 701/211; 701/212; 340/995.14; 340/995.26

(58) Field of Classification Search .................. 701/200, 701/207, 208, 209, 211, 212; 340/988, 995.14, 340/995.26, 995.27

See application file for complete search history.

(56) References Cited

U.S. PATENT DOCUMENTS

| | | | | |
|---|---|---|---|---|
| 6,285,347 | B1 | 9/2001 | Watanabe et al. | |
| 2004/0150534 | A1 | 8/2004 | Linn | |
| 2005/0202869 | A1 * | 9/2005 | Miyamoto et al. | 463/36 |
| 2008/0094367 | A1 * | 4/2008 | Van De Ven et al. | 345/173 |

FOREIGN PATENT DOCUMENTS

| | | |
|---|---|---|
| CN | 1201936 | 12/1998 |
| EP | 0 881 563 | 12/1998 |
| JP | 2001-108475 | 4/2001 |
| JP | 2006-214980 | 8/2006 |

* cited by examiner

*Primary Examiner* — Gertrude Arthur Jeanglaude
(74) *Attorney, Agent, or Firm* — The Farrell Law Firm, P.C.

(57) ABSTRACT

Disclosed is a method for enabling the user to easily and rapidly access a map image of a desired position in a navigation terminal. When a touch input through a touch screen is generated in a route guidance mode, a virtual scroll button having the form of a multi-directional keypad is displayed, and a dragging direction and a dragging displacement are calculated through the button. Then, map scrolling is performed according to the calculated dragging direction and dragging displacement, thereby displaying a corresponding map image. Accordingly, the user can easily and rapidly move the map image, making it possible to easily find a map image of a desired position.

10 Claims, 4 Drawing Sheets

100
110 POSITION MEASUREMENT UNIT
120 MAP DB UNIT
130 ROUTE CALCULATION UNIT
CONTROLLER
150 TOUCH SCREEN
160 TOUCH SCREEN INPUT CALCULATION UNIT
170 MAP OUTPUT CALCULATION UNIT
140 ROUTE GUIDANCE UNIT

MAP SCROLLING METHOD AND NAVIGATION TERMINAL

PRIORITY

This application claims priority to an application filed with the Korean Intellectual Property Office on Jul. 19, 2007, and assigned Serial No. 2007-72366, the contents of which are incorporated herein by reference.

BACKGROUND OF THE INVENTION

1. Field of the Invention

The present invention relates to a map scrolling method in a navigation terminal and the same navigation terminal, and more particularly to a method for easily and rapidly scrolling through a map image by the user, and a navigation terminal for the same.

2. Description of the Related Art

In general, a navigation terminal displays a map showing a current position on a touch screen. In this case, the current position is displayed on a certain reduced scale, and position data of the map is changed and displayed according to a traveling direction of the navigation terminal.

In order for the user to see a map image including a desired position using the touch screen in the navigation terminal, the user must repeatedly touch a point in a desired direction with respect to the center of the touch screen, or must repeatedly drag the map in the desired direction. Otherwise, when a separate map scroll button is included in the touch screen, the user scrolls through a map image by adjusting the map scroll button. For example, when the user wants to shift a certain point currently indicated in an upper portion in a screen to the center of the screen, the user moves the map image by touching an upper portion, by dragging the map, or by adjusting the map scroll button. In this case, since the movement of the map image is slowly performed, the user must repeatedly perform a key adjustment.

As described above, according to conventional map image scrolling methods, when the user desires to see a certain position, the user moves a map image through a touch input or a dragging task. However, such a method requires repeated touch inputs or dragging tasks when the desired position is far away from the currently displayed map. Furthermore, when the user is driving a car, it is very inconvenient for the user to repeat such inputs, and it is difficult for the user to rapidly find and see the desired position. In addition, when a map scroll button is included in a touch screen, since the button is displayed at a certain portion of the map image at all times, a part of the map corresponding to the portion of the button is obscured by the button when the map image is scrolled.

SUMMARY OF THE INVENTION

Accordingly, the present invention has been made to solve the above-mentioned problems occurring in the prior art, and the present invention provides a method and apparatus for enabling the user to easily and rapidly scrolling through a map image in a touch screen of a navigation terminal.

In accordance with an aspect of the present invention, there is provided a map scrolling method in a navigation terminal that includes a touch screen, with the method including determining if an input event through the touch screen is generated within a map image region in a route guidance mode; displaying a multi-directional keypad at a point where the input event is generated, when the input event is generated within the map image region; determining if a dragging event is generated in a state where the multi-directional keypad is displayed within the map image region; calculating a dragging direction and a dragging displacement corresponding to the generated dragging event; and adjusting a moving direction and a moving speed of the map image according to the calculated dragging direction and displacement.

In accordance with another aspect of the present invention, there is provided a navigation terminal that performs a map scrolling operation and includes a touch screen for outputting one among input, dragging and release signals through a screen touch by a user, and outputting a map image in a route guidance mode; a touch screen input calculation unit for, when a dragging signal is transferred after an input signal is generated from the touch screen, calculating a first position value of a point where a touch input by the user is generated and a second position value of a point to which a dragging operation is performed at a state where the touch input is applied, thereby calculating a dragging direction and a dragging displacement; a map output calculation unit for calculating map data to be displayed on the touch screen according to the dragging direction and dragging displacement calculated by the touch screen input calculation unit; and a controller for determining if the input signal is generated within a region of the map image in a route guidance mode, displaying a multi-directional keypad at a point where the input signal is generated when the input signal is generated within the map image region, and adjusting a moving speed and a moving direction of the map image according to the calculated dragging direction and displacement by using the map data provided from the map output calculation unit.

BRIEF DESCRIPTION OF THE DRAWINGS

The above and other aspects, features and advantages of the present invention will be more apparent from the following detailed description taken in conjunction with the accompanying drawings, in which.

DETAILED DESCRIPTION OF THE PREFERRED EMBODIMENTS

Hereinafter, exemplary embodiments of the present invention will be described with reference to the accompanying drawings. In the following description, a detailed description of known functions and configurations incorporated herein will be omitted when it may make the subject matter of the present invention rather unclear.

The present invention provides a method for enabling the user to easily and rapidly access a map image showing a desired position in a navigation terminal. To this end, according to the present invention, when a touch input is sensed through a touch screen in a route guidance mode, a virtual scroll button in the form of a multi-directional keypad is displayed, a dragging direction and a dragging displacement are calculated through the virtual scroll button. Map scrolling is performed in accordance with the calculated dragging direction and displacement, thereby displaying a corresponding map image. Accordingly, the user can easily and rapidly move the map image, and can easily find and see a desired position.

Figure 1:
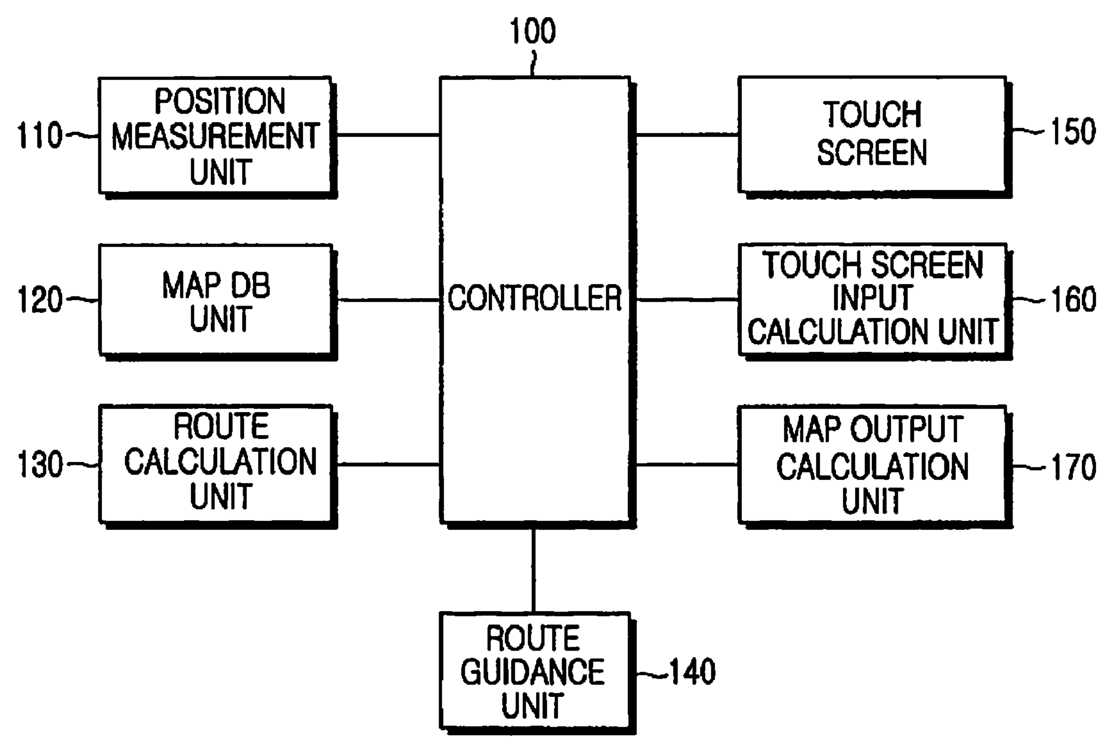
FIG. 1 is a block diagram illustrating the configuration of a navigation terminal according to an exemplary embodiment of the present invention.

The configuration of a navigation terminal for implementing the aforementioned function is shown in FIG. 1, showing a controller 100, a position measurement unit 110, a map database (DB) unit 120, a route calculation unit 130, a route guidance unit 140, a touch screen 150, a touch screen input calculation unit 160, and a map output calculation unit 170.

First, the position measurement unit 110 measures the current position by using a GPS receiver or a position measurement sensor, such as a gyro-sensor, an acceleration sensor, etc., and provides a result of the measurement to the controller 100. The map DB unit 120 stores and manages network data and maps, which are used for route calculation and route guidance, and displays data used for a screen output of a Point of Interest (POI).

The route calculation unit 130 calculates an optimal route from the current position to a destination selected by the user, and the route guidance unit 140 performs route guidance for the user through a screen output or voice output based on a result calculated by the route calculation unit 130.

The touch screen 150 receives an input through a screen touch by the user and outputs a graphic image through the touch screen. In detail, the touch screen 150 outputs any one among input, dragging and release signals generated through a screen touch by the user. Especially, in a route guidance mode, when a touch input is generated by the user in a state where a map image is displayed, the touch screen 150 outputs a virtual scroll button at the point where a touch input is applied.

When the touch screen input calculation unit 160 receives a dragging signal from the touch screen 150 after an input signal has been generated, the touch screen input calculation unit 160 calculates a position value of a first point where the touch input is generated by the user, and a position value of a second point to which movement has been made by dragging in a touched state. Here, a position value of the second point to which movement has been made by dragging may be defined as a "displacement," wherein the displacement is consecutively calculated while dragging is in progress until a touch input is released, after the touch input is generated. For example, unless the user releases his finger and is no longer touching a virtual scroll button displayed on the touch screen 150, the touch screen input calculation unit 160 will consecutively calculate a displacement according to the dragging movement.

The map output calculation unit 170 calculates map data to be displayed on the screen according to position values calculated by the touch screen input calculation unit 160 and changes in the position values, i.e., according to a calculated dragging direction and displacement.

The controller 100 enables the components to communicate with each other, and controls the respective components. In detail, the controller 100 determines if an input signal that is entered via the touch screen 150 is generated within a map image region in a route guidance mode, and displays a multi-directional keypad at the point where the input signal is generated when the input signal is generated within the map image region. Also, the controller 100 controls a moving speed and a moving direction of a map image according to a dragging direction and a dragging displacement calculated by the touch screen input calculation unit 160, by using map data provided by the map output calculation unit 170. In addition, the controller 100 removes the displayed multi-directional keypad when a release signal is generated, after the input signal has been generated.

Figure 2:
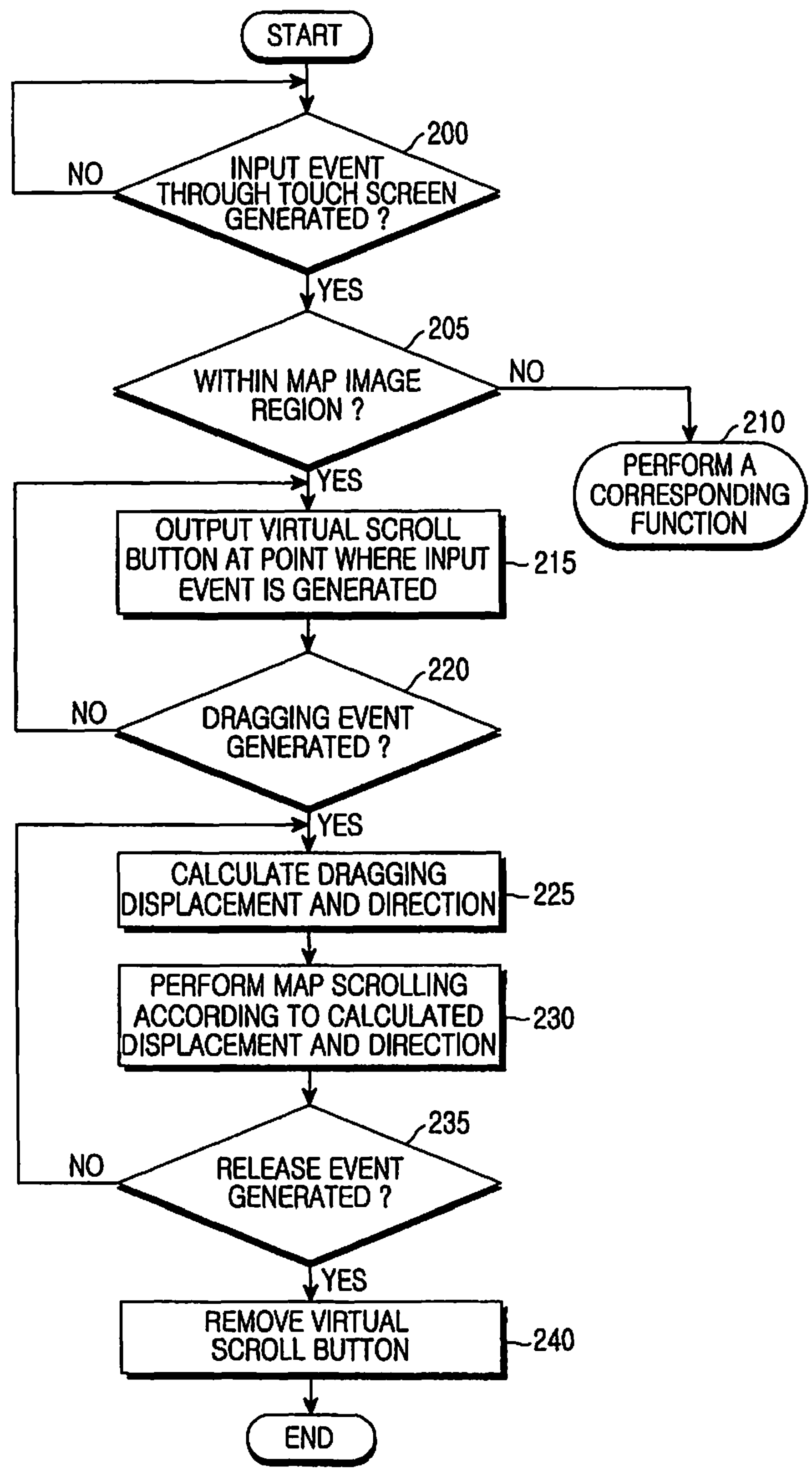
FIG. 2 is a flowchart illustrating a control method of a navigation terminal that provides a scroll function for a map image according to an exemplary embodiment of the present invention.

Referring to FIG. 2, which is a flowchart illustrating a control method of a navigation terminal that provides a scroll function for a map image according to an exemplary embodiment of the present invention, when a route guidance mode is entered, the current position of the user, who is moving, is indicated in a map image displayed on a touch screen of a navigation terminal through measurement for the current position. In the state where the current position has been indicated, in step 200 the navigation terminal determines if an input event is generated through the touch screen 150. That is, the navigation terminal determines if an input event signal is transferred to the navigation terminal.

When it is determined that an input event signal is transferred as a result, the navigation terminal determines if the input event has been generated within a map image region in step 205. In this case, since not only the map image region, but also a menu key region is generally displayed on the screen, when an input event is generated at a position outside of the displayed map image region, the navigation terminal performs a function corresponding to the input event generated through the menu key region in step 210.

Figure 3A:
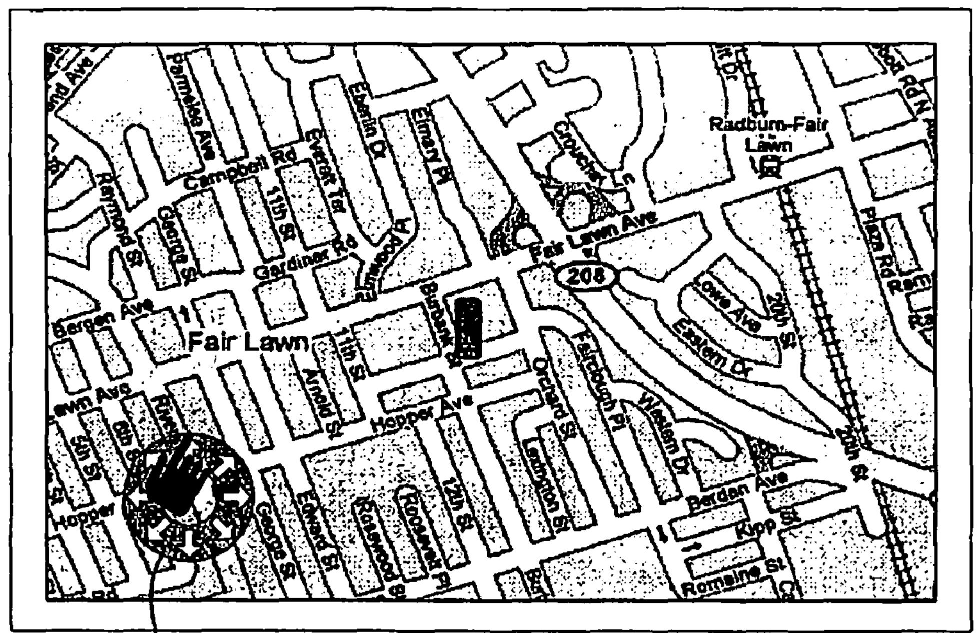
FIGS. 3A and 3B are map images showing changes depending on a map scrolling operation using a virtual scroll button according to an exemplary embodiment of the present invention.

In order to determine if an input event is generated within the map image region, as described above, the navigation terminal acquires a position value of a position where the input event has been generated, from the touch screen input calculation unit 160. With this, the navigation terminal determines if an acquired position value corresponds to a point within the map image region. When it is determined that the input event has been generated within the map image region, the navigation terminal outputs a virtual scroll button at an input-event generation point in step 215. Accordingly, the virtual scroll button 300 (FIG. 4) is overlapped and displayed on the map image of the touch screen 150, as shown in FIG. 3A. Here, the virtual scroll button 300 has the form of a multi-directional keypad so that the user can easily select a dragging direction. The operation and formation of the virtual scroll button is described in further detail below.

Meanwhile, when the virtual scroll button has been displayed, the navigation terminal determines if a dragging event is generated in step 220. When it is determined that a dragging event has been generated, the navigation terminal calculates a dragging displacement and a dragging direction through the touch screen input calculation unit 160 in step 225. In detail, the touch screen input calculation unit 160 calculates a direction along which dragging is performed from an initial position where the input event has been generated to the current position, and a displacement that is a movement distance from the initial position to the current position. In this case, when the user is continuously dragging in a certain direction, without separating his/her finger from the map image, a movement distance from the initial input position to the current position will continuously change, so that a displacement is consecutively calculated according to the change.

Then, the navigation terminal controls the map image to be scrolled according to the calculated dragging direction and dragging displacement. In detail, the navigation terminal controls the map output calculation unit 170 to calculate map data to be displayed on the screen corresponding to the displacement and direction calculated by the touch screen input calculation unit 160. Accordingly, the map image is displayed as if it moves on the touch screen 150.

Figure 3B:
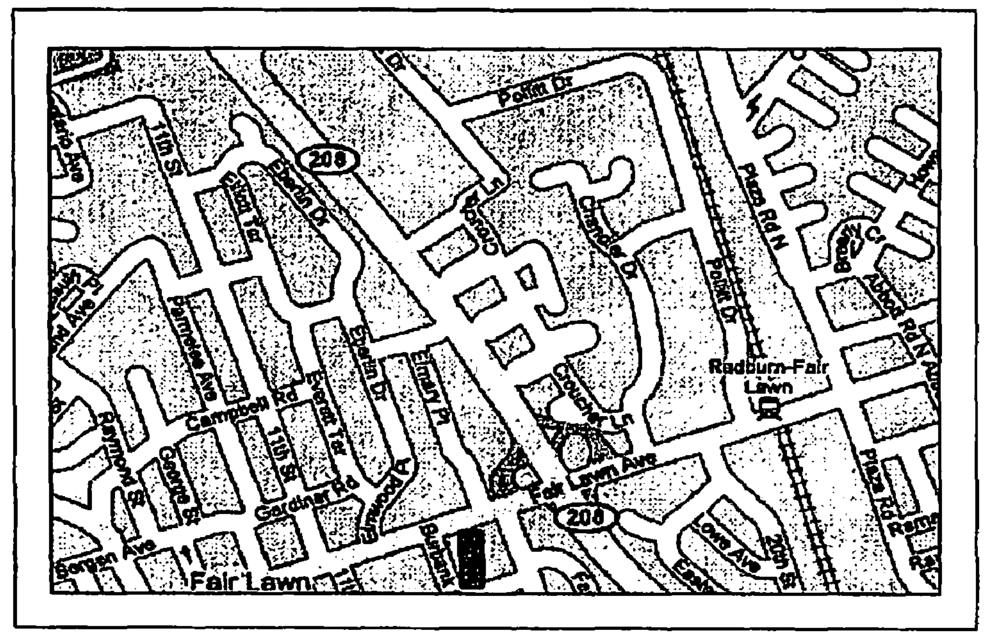

For example, FIGS. 3A and 3B are map images showing changes depending on a map scrolling operation using a virtual scroll button according to an exemplary embodiment of the present invention. Where a running car is positioned at the center, as shown in FIG. 3A, when the user performs a dragging operation in the upward direction using the virtual scroll button 300 and then releases the touch input, a map image corresponding to an upward area is displayed as shown in FIG. 3B, so that the current position of the car is displayed in a lower portion of the map image. As described above, the user can move the map image to display a desired position by performing a dragging operation in a desired direction, with his/her finger pressing the virtual scroll button. Thereafter, when the user separates his/her finger from the screen when a desired map image has been displayed, the virtual scroll button displayed at the point where the first touch input event has been generated disappears, so that the user can see a map image without a certain portion obscured by the button.

Particularly, according to an exemplary embodiment of the present invention, there is proposed a method capable of controlling a map scroll speed via a single virtual scroll button. To this end, a table in which map scroll speeds corresponding to dragging displacements have been appointed may be stored in advance. For example, it may be established that, as the dragging distance is longer with respect to a first input position, the map scroll speed is faster.

Accordingly, the map output calculation unit 170 determines a moving speed of a map image corresponding to a calculated displacement, and also calculates map data to output a map image corresponding to the calculated dragging direction. That is, a direction in which and a distance by which the current map image is to move are calculated according to a dragging displacement.

When a dragging event continues, the movement direction and movement speed of a map image are controlled according to a dragging direction and a dragging displacement in the aforementioned manner. In such a state, the navigation terminal determines if a release event, such as release of the touched user's finger, is generated in step 235. When the release event is not generated, the navigation terminal returns to step 225. Otherwise, when the release event is generated as a result of the determination, the navigation terminal proceeds to step 240, where the navigation terminal removes the virtual scroll button displayed on the touch screen 150. When an input through the touch screen 150 is terminated, as described above, the navigation terminal returns to a wait state of waiting for a user input, as shown in FIG. 3B.

Figure 4:
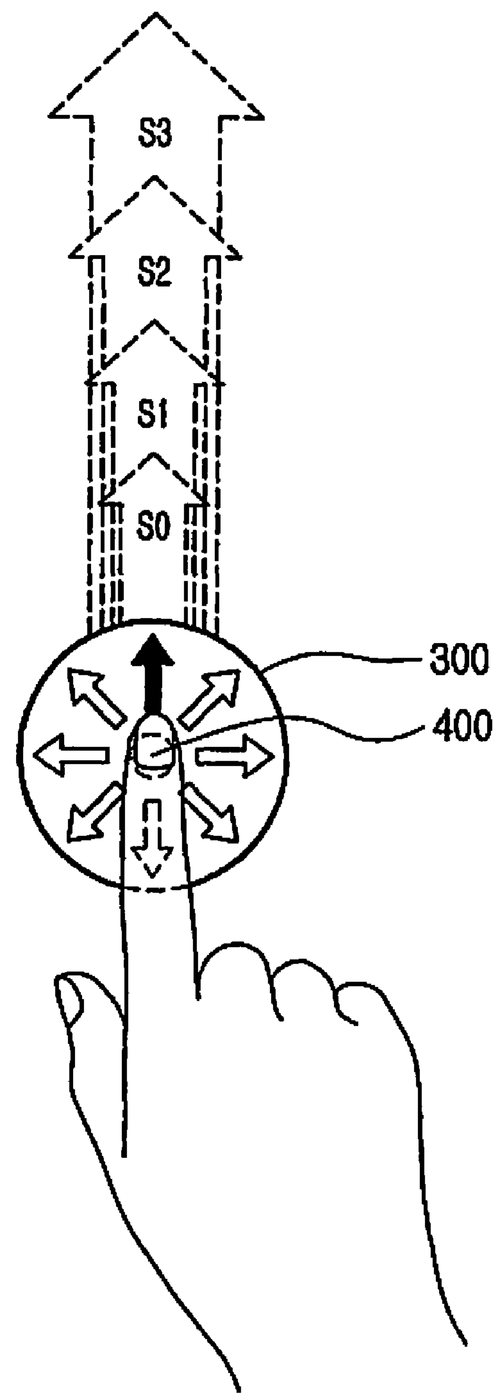
FIG. 4 is a plan view showing operation of a virtual scroll button according to an exemplary embodiment of the present invention.

Hereinafter, the operation of a virtual scroll button will be described in detail with reference to FIG. 4, is a plan view showing the operation of a virtual scroll button according to an exemplary embodiment of the present invention.

When the user touches his/her finger to a point within a map image region, the virtual scroll button 300 is displayed, wherein the virtual scroll button 300 is preferably shown in the form of a multi-directional keypad so that the user can select a dragging direction. FIG. 4 illustrates a case where the user performs a dragging operation in a due north direction, wherein a first input point corresponds to the center 400 of the virtual scroll button 300. In the case where the center 400 is (X1, Y1), whenever the user performs a dragging operation in the upward direction, a map is scrolled continuously corresponding to a dragging displacement. For example, as shown in FIG. 4, where dragging displacements are established in a sequence of S0, S1, S2 and S3, when the user performs a dragging operation to displacement "S0," a map image will scrolled slowly. Also, when the user performs a dragging operation to displacement "S3," the map image may be scrolled quickly, which is advantageous when a position that the user wishes to find is far away from the currently-displayed map image. In this case, it is preferred that the maximum value of the map scroll speed is preset by taking into consideration a time required for calculating map data to be output through the screen so that the required time can be ensured although the user continuously performs a dragging operation in the upward direction.

Such a method does not require a plurality of touch operations and repeated dragging operations, and enables the user to control the map scroll speed, as well as to drag a map image in a desired direction, even with only one finger, without a large movement.

According to the present invention, since a virtual scroll button is provided on a touch screen, the user can easily scroll a map image to a desired position even with only one finger, without a large movement, thereby improving the convenience in use of the navigation terminal. In addition, according to the present invention, since the user can directly adjust the scroll speed for the map image, it is possible for the user to easily and rapidly see a map image positioned far away from the currently-displayed map image.

While the present invention has been shown and described with reference to certain exemplary embodiments thereof, it will be understood by those skilled in the art that various changes in form and details may be made therein without departing from the spirit and scope of the invention as defined by the appended claims. Accordingly, the scope of the invention is not to be limited by the above embodiments but by the claims and the equivalents thereof.

What is claimed is:

1. A map scrolling method in a navigation terminal comprising a touch screen, the method comprising the steps of:
- determining if an input event is generated within a map image region in a route guidance mode, wherein the input event is entered through the touch screen;
- displaying a multi-directional keypad at a point where the input event is generated, when the input event is determined to be generated within the map image region;
- determining if a dragging event is generated in a state where the multi-directional keypad is displayed within the map image region;
- calculating a dragging direction and a dragging displacement corresponding to the generated dragging event; and
- adjusting a moving direction and a moving speed of a map image according to the calculated dragging direction and displacement.

2. The method as claimed in claim 1, further comprising:
- determining if a release event is generated after the input event has been generated; and
- removing the multi-directional keypad when the release event is determined to be generated.

3. The method as claimed in claim 1, wherein, in the step of calculating the dragging direction and dragging displacement, the dragging direction and dragging displacement are calculated from where the input event is generated.

4. The method as claimed in claim 3, wherein the moving speed of the map image becomes faster as the dragging displacement is larger with respect to where the input event is generated.

5. The method as claimed in claim 1, wherein the multi-directional keypad is overlapped and displayed on the map image.

6. A navigation terminal for performing a map scrolling operation, the navigation terminal comprising:
- a touch screen for outputting input, dragging and release signals through a screen touch input by a user, and outputting a map image in a route guidance mode;

a touch screen input calculation unit for, when a dragging signal is transferred after an input event is generated from the touch screen, calculating a first position value of a point where a touch input by the user is generated and a second position value of a point to which a dragging operation is performed at a state where the touch input is applied, thereby calculating a dragging direction and a dragging displacement;

a map output calculation unit for calculating map data to be displayed on the touch screen according to the dragging direction and dragging displacement calculated by the touch screen input calculation unit; and a controller for determining if the input signal is generated within a region of the map image in a route guidance mode, displaying a multi-directional keypad at a point where the input signal is generated when the input signal is generated within the map image region, and adjusting a moving speed and a moving direction of the map image according to the calculated dragging direction and displacement by using the map data provided from the map output calculation unit.

7. The navigation terminal as claimed in claim 6, wherein the controller determines if a release event is generated after the input event has been generated, and removes the multi-directional keypad when the release event is generated.

8. The navigation terminal as claimed in claim 6, wherein the touch screen input calculation unit calculates the dragging direction and dragging displacement from the point where the input event is generated.

9. The navigation terminal as claimed in claim 6, wherein the moving speed of the map image becomes faster as the dragging displacement increases with respect to the point where the input event is generated.

10. The navigation terminal as claimed in claim 6, wherein the multi-directional keypad is overlapped and displayed on the map image.

* * * * *